United States Patent
Wu et al.

(10) Patent No.: US 8,165,742 B2
(45) Date of Patent: Apr. 24, 2012

(54) SYSTEM AND METHOD FOR COMPENSATING SENSOR SIGNALS

(75) Inventors: Hsiencheng Wu, Novi, MI (US); Qingyuan Li, Ann Arbor, MI (US); Daniel Patient, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 749 days.

(21) Appl. No.: 12/271,490

(22) Filed: Nov. 14, 2008

(65) Prior Publication Data
US 2010/0131140 A1   May 27, 2010

(51) Int. Cl.
*G06F 11/00* (2006.01)
(52) U.S. Cl. ........................ 701/29.1; 180/170
(58) Field of Classification Search .................. 701/29, 701/36, 38, 93, 70, 29.1; 180/170, 179; 280/5.502
See application file for complete search history.

(56) References Cited

U.S. PATENT DOCUMENTS

| | | | |
|---|---|---|---|
| 4,930,082 A | 5/1990 | Harara et al. | |
| 4,974,163 A * | 11/1990 | Yasuno et al. | 701/74 |
| 5,060,157 A | 10/1991 | Tado et al. | |
| 5,988,848 A | 11/1999 | Berstecher et al. | |
| 6,175,792 B1 | 1/2001 | Jones et al. | |
| 6,611,781 B1 | 8/2003 | Gutmann | |
| 6,662,622 B2 | 12/2003 | Braun | |
| 6,704,631 B2 | 3/2004 | Winner et al. | |
| 6,795,763 B2 | 9/2004 | Yao et al. | |
| 6,810,311 B2 | 10/2004 | Winner et al. | |
| 6,898,585 B2 | 5/2005 | Benson et al. | |
| 7,079,959 B2 | 7/2006 | Bai et al. | |
| 7,085,642 B2 | 8/2006 | Samuel et al. | |
| 7,234,564 B2 * | 6/2007 | Farrelly et al. | 180/412 |
| 7,818,107 B2 * | 10/2010 | Schwarz et al. | 701/41 |
| 2003/0135290 A1 | 7/2003 | Yao et al. | |
| 2007/0288146 A1 | 12/2007 | Schwarz et al. | |

FOREIGN PATENT DOCUMENTS

| | | |
|---|---|---|
| JP | 07218520 | 8/1995 |
| WO | 2007/065740 | 6/2007 |

OTHER PUBLICATIONS 09013831.4 extended European search report dated Feb. 23, 2010 (8 pages).
Kobayashi, Kazuyuki, et al., "Estimation of Absolute Vehicle Speed Using Fuzzy Logic Rule-Based Kalman Filter", Proceedings of the American Control Conference, vol. 5, pp. 3086-3090, XP002568145, Jun. 1, 1995.

* cited by examiner

*Primary Examiner* — Dalena Tran
(74) *Attorney, Agent, or Firm* — Michael Best & Friedrich LLP

(57) ABSTRACT

A system and method for compensating sensor signals. The system includes a first sensor, a second sensor, a fuzzy logic module, and a Kalman filter module. The first sensor is configured to generate a first signal corresponding to a first condition of a vehicle. The second sensor is configured to generate a second signal corresponding to a second condition of the vehicle. The fuzzy logic module is configured to output a first set of values based on a signal stability of at least the second signal. The Kalman filter module is configured to receive the first set of values and the first signal and estimate a sensor compensation signal based on at least the first set of values and the first signal.

20 Claims, 7 Drawing Sheets

SYSTEM AND METHOD FOR COMPENSATING SENSOR SIGNALS

BACKGROUND

The present invention relates to compensating sensor signals in an electronic stability control ("ESC") system or electronic stability program ("ESP") of a vehicle. A vehicle that includes an ESC system utilizes several sensors to estimate a current "state" of the vehicle. The ESC system sensors generate and send information to an electronic control unit ("ECU") of the ESC system. The ESC system sensors include, for example, steering-wheel angle sensors, yaw rate sensors, lateral acceleration sensors, and wheel speed sensors. The ECU detects circumstances that may affect the vehicle's stability or a driver's control of the vehicle. The ESC system is capable of controlling various systems and functions within the vehicle such as anti-lock braking, traction control, etc. A control algorithm of the ESC system compares a driver's input signals to the vehicle's response (e.g., the vehicle's state as determined from the sensors in the ESC).

SUMMARY

The sensors used by the ESC system to correct defects and maintain control and stability of the vehicle can be disturbed or corrupted by the vehicle's environment. For example, the sensors (or, more particularly, the information they provide) can be disturbed or corrupted if the vehicle is traveling uphill, downhill, or over bumpy terrain. As a result, the sensors provide signals to the ECU that do not accurately represent the state of the vehicle, which can affect the performance, stability, and safety of the vehicle.

In light of the above-noted deficiencies of ESC systems, there is a need for a system and method for compensating sensor signals for disturbances related to a vehicle's environment.

In one embodiment, the ECU uses, in part, a value for an absolute longitudinal velocity of the vehicle to determine a "state" of the vehicle. The absolute longitudinal velocity of the vehicle is necessary to determine, for example, when the vehicle is skidding or sliding. However, the value of the absolute longitudinal velocity of the vehicle can be corrupted if the vehicle is traveling uphill, downhill, or over bumpy terrain, and the measured speed of the vehicle from wheel speed sensors may not be reflective of the absolute longitudinal velocity of the vehicle. The ESC system may also include an acceleration sensor to measure the longitudinal acceleration of the vehicle. Like the longitudinal velocity of the vehicle, the longitudinal acceleration of the vehicle can be corrupted by the vehicle's environment. A longitudinal acceleration sensor offset is estimated and used to compensate sensor signals input to the ESC system.

To accurately estimate the longitudinal acceleration sensor offset and the absolute longitudinal velocity of the vehicle, the system uses a plurality of wheel speed signals from wheel speed sensors, the longitudinal acceleration sensor, a fuzzy logic module, and a Kalman filter module. The wheel speed sensors provide signals representative of the speed of the vehicle's wheels. The wheel speed signals are processed and then provided to the fuzzy logic unit in combination with first and second derivatives of each of the wheel speed signals (e.g., wheel acceleration and wheel jerk signals). The fuzzy logic unit uses the signals to determine a wheel stability probability for each of the wheels and calculate a plurality of Kalman filter gain coefficients. The wheel stability probabilities and the Kalman filter gain coefficients are sent to the Kalman filter module which estimates the acceleration sensor offset and the absolute longitudinal velocity for the vehicle. The acceleration sensor offset is combined with a corrupted acceleration sensor signal to generate a compensated acceleration sensor signal. The compensated acceleration sensor signal and the estimated absolute longitudinal velocity of the vehicle are sent to the ECU of the ESC system.

In another embodiment, the invention provides a system for sensor signal compensation that includes a first sensor, a second sensor, a fuzzy logic module, and a Kalman filter module. The first sensor generates a first signal corresponding to a first condition of a vehicle. The second sensor is configured to generate a second signal corresponding to a second condition of the vehicle. The fuzzy logic module is configured to output a first set of values related to a signal stability of at least the second signal. The Kalman filter module is configured to receive the first set of values and the first signal and estimate a sensor compensation signal based on at least the first set of values and the first signal.

In another embodiment, the invention provides a method of compensating sensor signals. The method includes generating a first signal corresponding to a first condition of a vehicle and generating a second signal corresponding to a second condition of the vehicle. A fuzzy logic module receives at least the second signal and outputs a first set of values based on a signal stability of at least the second signal. The method also includes a Kalman filter module receiving the first set of values and the first signal and estimating a sensor compensation signal based on at least the first set of values and the first signal.

In yet another embodiment, the invention provides a system for compensating sensor signals in a vehicle. The system includes an acceleration sensor, a wheel speed sensor, a fuzzy logic module, and a Kalman filter module. The acceleration sensor is configured to generate an acceleration signal corresponding to a first acceleration of the vehicle. The wheel speed sensor is configured to generate a first wheel speed signal corresponding to a first wheel speed of the vehicle. The fuzzy logic module is configured to output a first set of values corresponding to a signal stability of at least the first wheel speed signal. The Kalman filter module is configured to receive the first set of values and the acceleration signal and estimate an acceleration sensor compensation signal using at least the first set of values and the acceleration signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
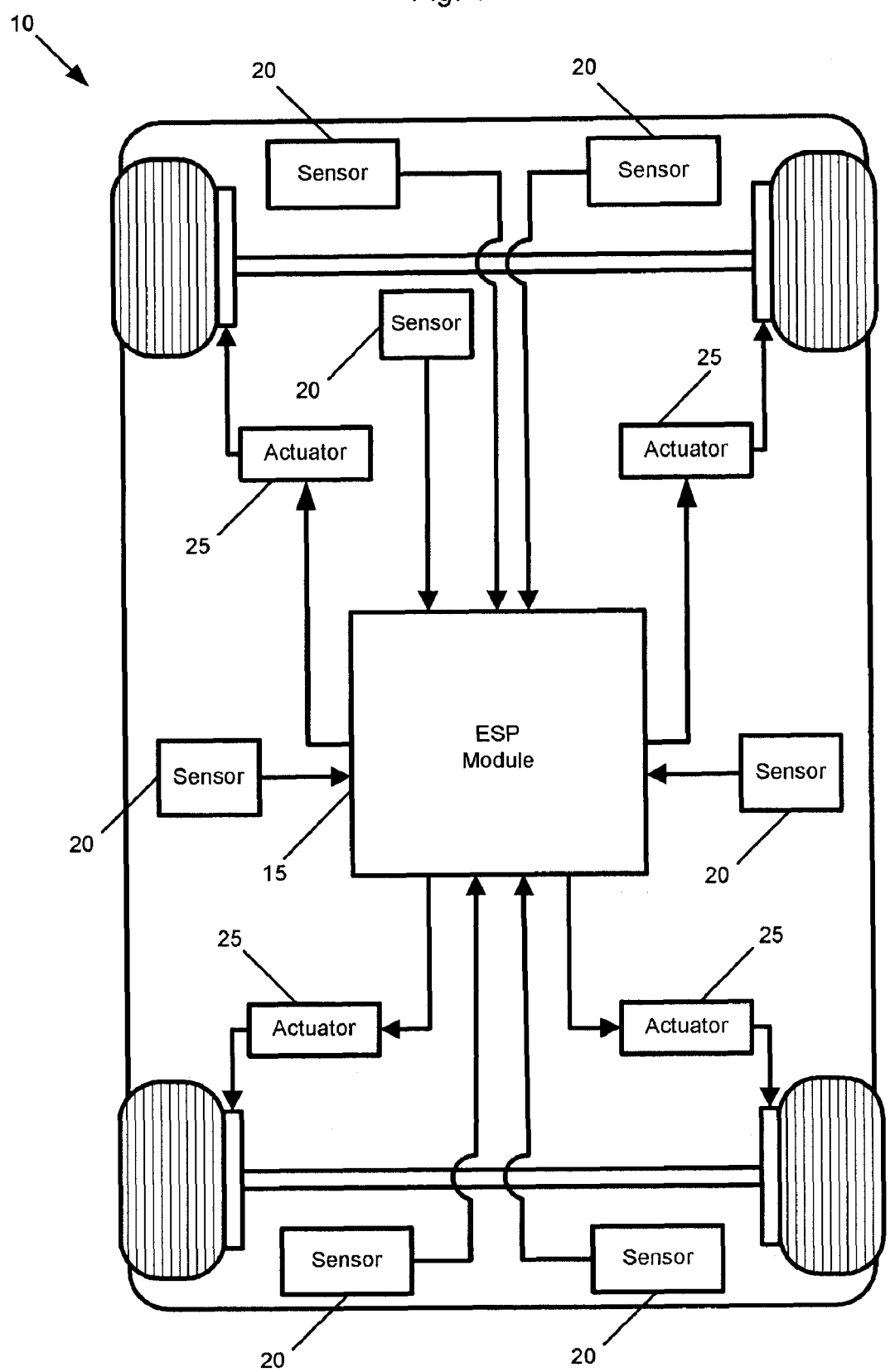
FIG. 1 illustrates a vehicle that includes an electronic stability control ("ESC") system.

FIG. 1 illustrates a vehicle 10 that includes an electronic stability control ("ESC") module 15, a plurality of sensors 20, and a plurality of actuators 25. The plurality of sensors 20 include sensors for sensing a variety of conditions of the vehicle 10, such as, for example, wheel speed, acceleration, drift, etc. In the illustrated embodiment, the actuators 25 are, for example, hydraulic pumps that apply pressure to brakes in a braking system. The sensors 20 sense, among other things, the pressure applied to the brakes by the hydraulic pumps, wheel speed, and longitudinal acceleration. In other embodiments of the invention, additional or different ESC subsystems, sensors, and actuators can be used.

The ESC module 15 uses sensor information to determine what actions to take to maintain or improve the performance, stability, and safety of the vehicle 10. However, the sensors 20 coupled to the ESC module 15 are subject to errors and/or noise. For example, the ESC module 15 requires an accurate estimation or calculation of the absolute longitudinal velocity of the vehicle 10. The absolute longitudinal velocity of the vehicle 10 is not always equivalent to the speed of the wheels (e.g., when the wheels are skidding or sliding), which can result in errors in the determinations made by the ESC module 15. White noise and sensor power fluctuations can also introduce additional errors into the determinations made by ESC module 15 which must be compensated.

Figure 2:
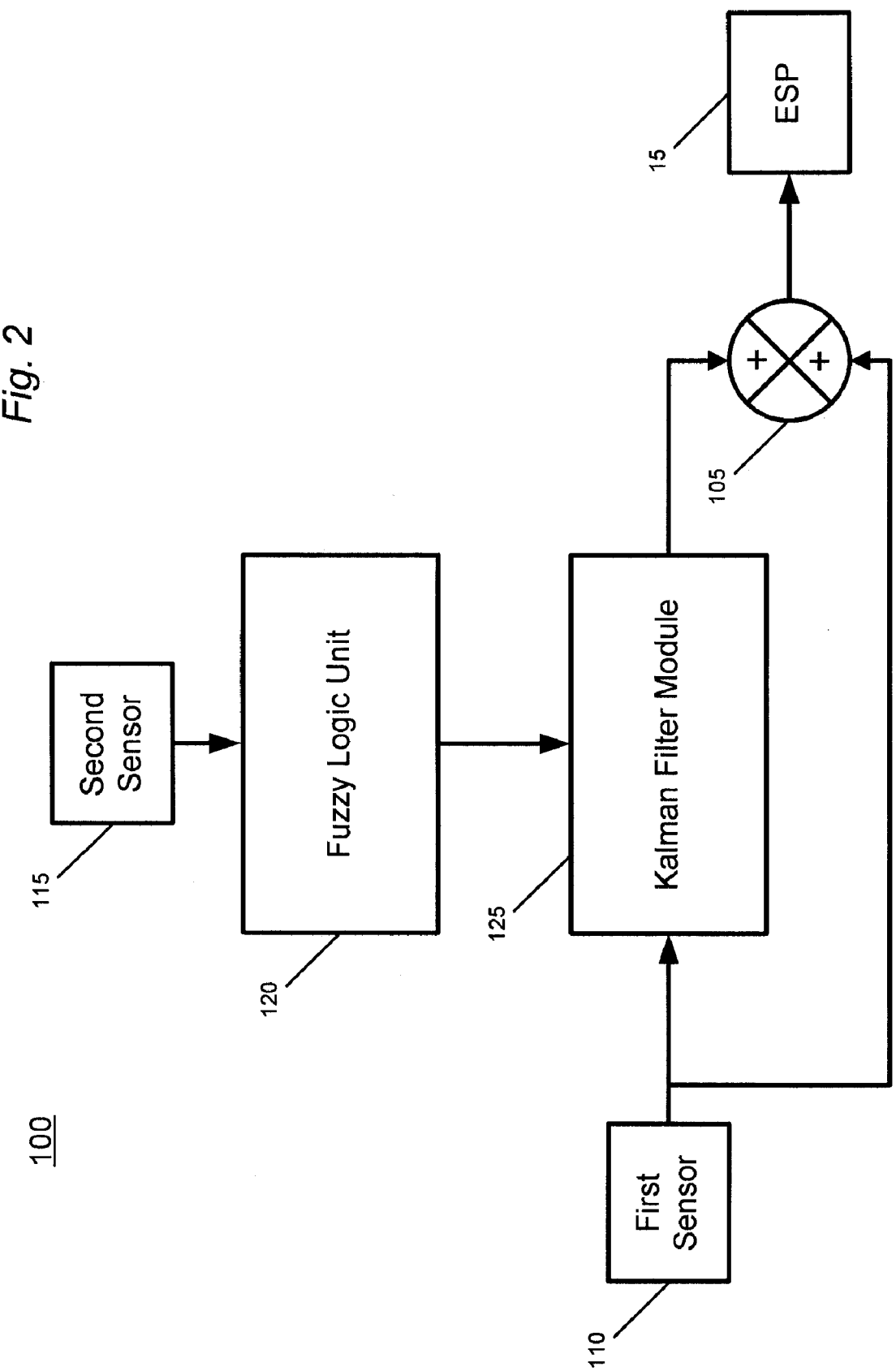
FIG. 2 illustrates a system for compensating sensor signals.

FIG. 2 illustrates a sensor signal compensation system 100. The sensor signal compensation system 100 includes a combiner 105, a first sensor 110, a second sensor 115, a fuzzy logic unit 120, and a Kalman filter module 125. The first sensor 110 is, in one embodiment, a longitudinal acceleration sensor. In one embodiment, the acceleration sensor 110 is configured to output a signal representative of a longitudinal acceleration of the vehicle. In some embodiments, if the vehicle 10 is traveling over level ground (i.e., zero incline), the acceleration sensor outputs a value equal zero. If the vehicle 10 is traveling over ground that includes an incline (e.g., a 20% incline), the acceleration sensor outputs a signal that is not equal to zero.

The vehicle's overall acceleration is a summation of a vertical acceleration vector, a longitudinal acceleration vector, and a lateral acceleration vector. For descriptive purposes, the vehicle's acceleration is described herein with respect to the longitudinal acceleration component. However, the sensor signal compensation system 100 can be applied to other vector components or conditions of the vehicle 10. As described above, when the vehicle 10 is on level ground (i.e., no incline), the longitudinal acceleration sensor offset is equal to zero. If the vehicle 10 is at an incline, the longitudinal acceleration measured by the longitudinal acceleration sensor 110 is a vector sum of two components, one normal to the incline and one parallel to the incline. The offset that the acceleration sensor experiences is approximately equal to the acceleration due to gravity multiplied by the sine of the incline (in degrees or radians). For example, a 20% incline is approximately equal to an 18° incline. An 18° incline results in an estimated acceleration sensor offset approximately equal to that shown below, where $g=9.81$ m/s².

$$(g) \cdot \sin(18°) = 3.03 \, \frac{m}{s^2}$$

A similar estimation can be made for a vehicle 10 that is traveling over ground with a 20% decline, but the angle of the decline is approximately equal to $-18°$ and the acceleration sensor offset is, therefore, a negation of the 18° incline instance. The acceleration sensor offset is related to the vehicle acceleration component that is parallel to the incline.

The second sensor 115 is, in one embodiment, a wheel speed sensor, which provides wheel speed signals related to a wheel of the vehicle. Wheel speed sensors can be used to provide wheel speed signals for each of the wheels of the vehicle 10 (e.g., each of four wheels). The wheel speed signals from the second sensor 115 are processed by a software module (not shown) and then output to the fuzzy logic unit. The software module receives the wheel speed signals for each of the wheels of the vehicle 10 and calculates wheel acceleration signals by taking a first derivative of the wheel speed signals and wheel jerk signals by taking a second derivative of the wheel speed signals. The software module outputs the wheel speed signals for each wheel of the vehicle 10, the acceleration signals for each wheel, and the wheel jerk signals for each wheel to the fuzzy logic unit 120.

The fuzzy logic unit 120 receives the wheel speed signals, the wheel accelerations signals, and the wheel jerk signals related to each of the vehicle 10's wheels. The fuzzy logic unit 120 uses the signals to calculate a wheel stability probability for each wheel of the vehicle 10. A set of wheel stability probabilities is output to the Kalman filter module. The wheel stability probability is a variable which corresponds to an estimated reliability of the signals received for each wheel. In other words, the wheel stability probability is a calculation of the probability that a wheel speed signal is suitable to be used to estimate the absolute longitudinal velocity of the vehicle 10. The values of the fuzzy probabilities are dependent on, among other things, the stability of sensor signals, an uncertainty estimation, and the vehicle 10's driving situation, as described below.

Figure 3:
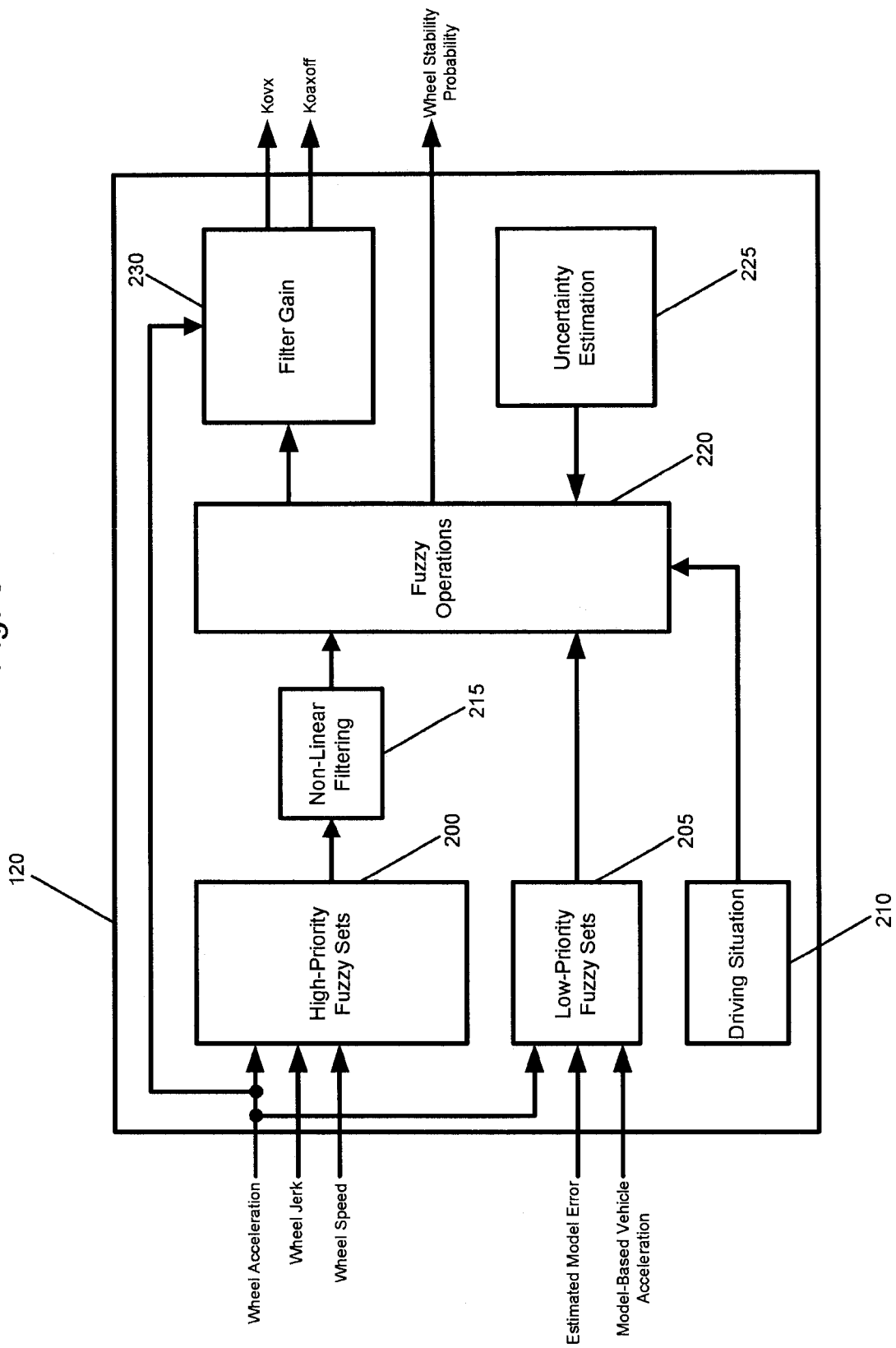
FIG. 3 illustrates a fuzzy logic unit according to an embodiment of the invention.

FIG. 3 illustrates the fuzzy logic unit 120. The fuzzy logic unit 120 includes a high-priority adaptive fuzzy sets module 200, a low-priority adaptive fuzzy sets module 205, a driving situation module 210, a non-linear filtering module 215, a fuzzy operations module 220, an uncertainty estimation module 225, and a filter gain module 230. The high-priority fuzzy sets module 200 receives input signals (e.g., wheel speed signals, the wheel acceleration signals, and the wheel jerk signals) which are used to analyze the stability of the wheels. The high-priority fuzzy sets module 200 uses the input signals to generate strong, high-fidelity fuzzy sets. The strong fuzzy sets are the fuzzy sets that have the greatest impact on the wheel stability analysis.

The low-priority fuzzy sets module 205 receives input signals such as the wheel acceleration signal, an estimated model error signal, and a model-based vehicle acceleration signal. The model-based vehicle acceleration signal is a representation of the vehicle's acceleration over ground which is based on signals related to, for example, engine torque and wheel pressures. The estimated model error signal represents an estimated deviation from the model-based vehicle acceleration. The low-priority fuzzy sets module 205 uses these input signals to generate low-priority fuzzy sets that are used in combination with the higher priority fuzzy sets generated by the high-priority fuzzy sets module.

The non-linear filtering module 215 is configured to associate a weight or importance to each input signal (e.g., wheel acceleration, wheel jerk, etc.) of the high-priority fuzzy sets module, and the driving situation module 210 is configured to identify the driving state of the vehicle. For example, in one embodiment, the driving situation module 210 is configured to identify whether the vehicle 10's driving situation is (1) accelerating, (2) decelerating, or (3) unknown.

The uncertainty estimation module 225 provides a signal to the fuzzy operations module 220 related to the uncertainty of a wheel stability probability over an extended period of time, which allows the sensor signal compensation system 100 to compensate for anomalous or highly unstable wheel speed signals. For example, if the signals received from the wheel speed sensors demonstrate a high degree of unreliability, the fuzzy operations module 220 uses the uncertainty estimation signal to determine the wheel stability probabilities in place of the wheel speed signals. The reliability and instability of wheel speed signals are described in detail below with respect to operations carried out by the fuzzy operations module for one embodiment of the invention.

The fuzzy operations module 220 uses the weighted, high-priority fuzzy sets, the low-priority fuzzy sets, the uncertainty estimation signal, and a driving situation signal to calculate wheel stability probabilities for each wheel. Examples of fuzzy operations (i.e., fuzzy logic tests) used to determine wheel stability probabilities are given and described below. For example, unstable wheel speed signals have a high absolute value of wheel jerk (i.e., the second derivative of the wheel speed signal). An example of a fuzzy test that is executed in the fuzzy operations module for determining whether the absolute value of the wheel jerk is large is given below as Test #1.

| Test #1: | |
|---|---|
| absolute value of wheel jerk small | [1] |
| AND smallest absolute value of wheel jerk | [2] |
| OR distance between smallest and largest absolute value of wheel jerk small | [3] |

As an illustrative example, assume that the values of wheel jerk for each of the wheels of the vehicle 10 are those given below in Table #1.

TABLE #1

| Values of Wheel Jerk | | |
|---|---|---|
| 1. | Left-Front Wheel [m/s³] | 7 |
| 2. | Right-Front Wheel [m/s³] | 30 |
| 3. | Left-Rear Wheel [m/s³] | 100 |
| 4. | Right-Rear Wheel [m/s³] | 200 |

Figure 5A:
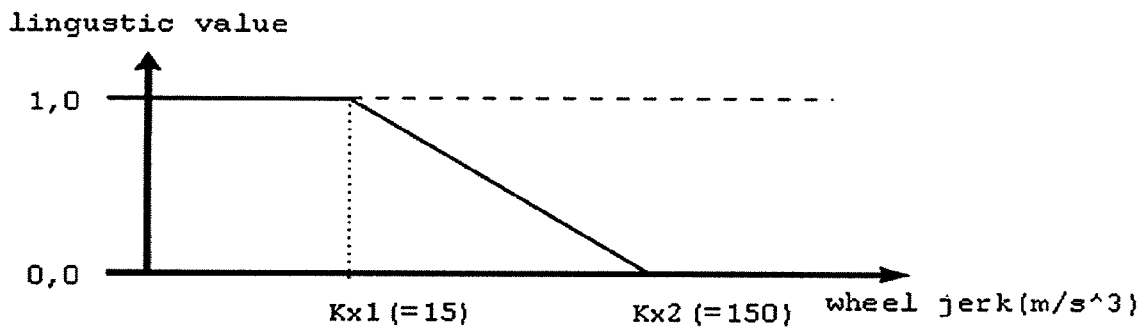
FIG. 5A is a diagram of a fuzzy plot for a fuzzy variable "small."

A linguistic value for line 1 of Test #1 is determined using FIG. 5A, which shows a fuzzy plot for the fuzzy variable "small." $K_{x1}$ and $K_{x2}$ are predetermined values that are based on characteristics of the vehicle and characteristics of the ESC module 15. The linguistic value for line 1 of Test #1 is determined for each wheel of the vehicle 10 by associating the value of the wheel jerk for each wheel with a value of the fuzzy plot for the "small" operator. A wheel jerk of between 0 and 15 m/s³ has a value of 1.000. A wheel jerk of 150 m/s³ or greater has a value of approximately 0.000.

The corresponding fuzzy output estimates for each wheel of the vehicle are given below in Table #2. Each fuzzy output estimate is estimated to three decimal places in this embodiment of the invention. Wheel jerk values greater than 150 m/s³ are assigned a value of 0.000. For wheel jerk values between 15 and 150 m/s³, the linguistic value of the fuzzy output estimate is determined using linear interpolation. Line 1 of Test #1 is used to determine the fuzzy output estimate corresponding to the lowest wheel jerk among the wheels of the vehicle 10. In the illustrated example, the output of line 1 of Test #1 is 1.000, which corresponds to the fuzzy output estimate of the left-front wheel.

TABLE #2

| Line 1 Fuzzy Output Estimates | | |
|---|---|---|
| 1. | Left-Front Wheel [m/s³] | 1.000 |
| 2. | Right-Front Wheel [m/s³] | 0.778 |
| 3. | Left-Rear Wheel [m/s³] | 0.259 |
| 4. | Right-Rear Wheel [m/s³] | 0.000 |

Figure 5B:
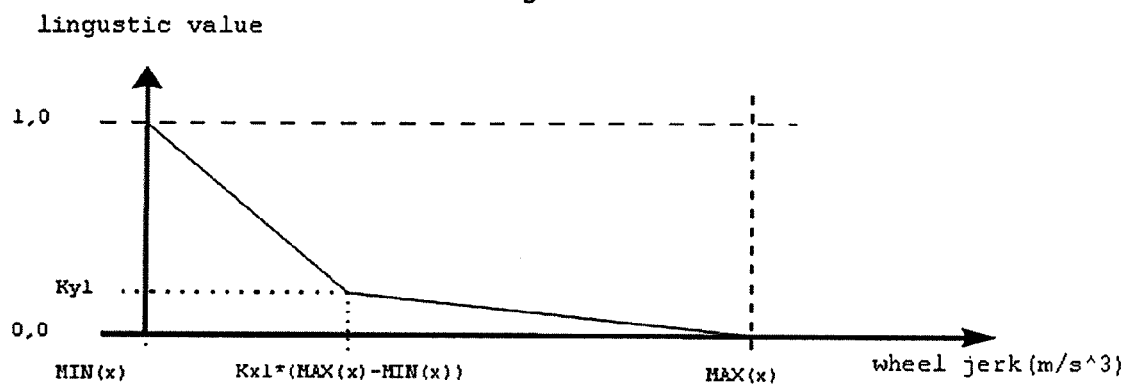
FIG. 5B is a diagram of a fuzzy plot for a fuzzy variable "smallest."

A linguistic value for line 2 of Test #1 is determined using FIG. 5B, which shows a fuzzy plot for the fuzzy variable "smallest." $K_{x1}$ and $K_{y1}$ are predetermined values that are based on characteristics of the vehicle and characteristics of the ESC module 15. In the illustrated embodiment, $K_{x1}$ is equal to 0.936 and $K_{y1}$ is equal to 0.1. The linguistic value for line 2 of Test #1 is determined for each wheel of the vehicle by associating the absolute value of the wheel jerk for each wheel with a value of the fuzzy plot for the fuzzy variable "smallest."

The smallest absolute value of wheel jerk is assigned a fuzzy output estimate of 1.000, and the largest absolute value of wheel jerk is assigned a fuzzy output estimate of 0.000. The plot of the fuzzy operator "smallest" includes two lines of different slopes which intersect at the point ($K_{x1}$*(MAX(x)−MIN(x)), $K_{y1}$). The corresponding fuzzy output estimates for each wheel of the vehicle are given below in Table #3.

TABLE #3

| Line 2 Fuzzy Output Estimates | | |
|---|---|---|
| 1. | Left-Front Wheel [m/s³] | 1.000 |
| 2. | Right-Front Wheel [m/s³] | 0.880 |
| 3. | Left-Rear Wheel [m/s³] | 0.416 |
| 4. | Right-Rear Wheel [m/s³] | 0.000 |

Figure 5C:
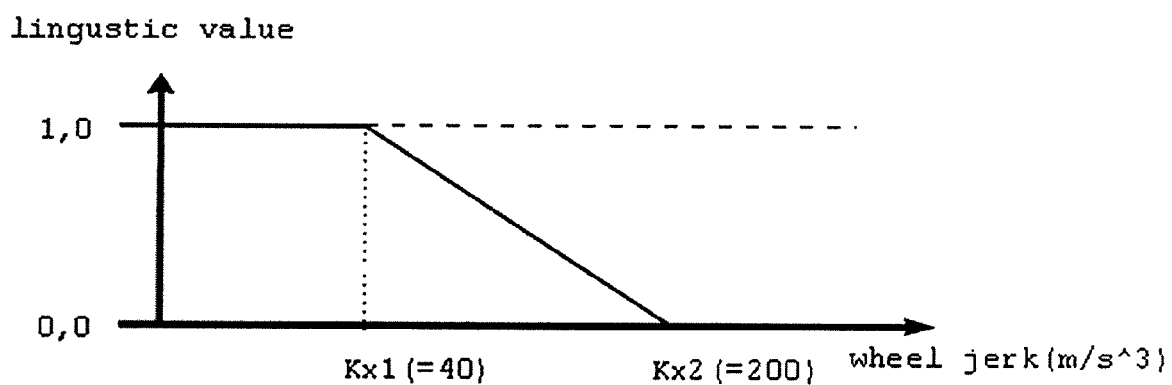
FIG. 5C is a diagram of a fuzzy plot associated with a relative distance between two wheel jerk values.

A linguistic value for line 3 of Test #1 is determined using FIG. 5C, which shows a fuzzy plot associated with the relative distance between two wheel jerk values. $K_{x1}$, and $K_{x2}$ are predetermined values that are based on characteristics of the vehicle and characteristics of the ESC module 15. The linguistic value for line 3 of Test #1 is determined for each wheel of the vehicle using the difference between the largest value of wheel jerk and the smallest value of wheel jerk. In the illustrated embodiment, the difference between the largest value of wheel jerk and the lowest value of wheel jerk is given as $$200 \frac{m}{s^3} - 7 \frac{m}{s^3} = 193 \frac{m}{s^3}$$

The corresponding fuzzy output value is 0.044 for each of the wheels of the vehicle. The fuzzy output estimates for lines 1, 2, and 3 for Test #1 are then combined according to the fuzzy operators from Test #1. The fuzzy operator "OR" is given as $$y_1 = OR(x_1, x_2)$$
$$y_1 = \gamma_1 \cdot MAX(x_1, x_2) + (1 - \gamma_1) \cdot \frac{x_1 + x_2}{2}$$

For the illustrated embodiment of Test #1, $\gamma_1 = 0.95$, $x_1 = 1.000$ (fuzzy output estimate of line 2 for the front-left wheel), and $x_2 = 0.044$ (fuzzy output estimate of line 3). The value of $y_1$ is calculated to be 0.976 and becomes the input $x_2$ of the "AND" operation. The fuzzy variable "AND" is given as $$y_2 = AND(x_1, x_2)$$
$$y_2 = \gamma_2 \cdot MIN(x_1, x_2) + (1 - \gamma_2) \cdot \frac{x_1 + x_2}{2}$$

For the illustrated embodiment of Test #1, $\gamma_2 = 0.8$, $x_1 = 1.000$ (fuzzy output of line 1 for the left-front wheel), and $x_2 = 0.976$ (result of OR operation). The value of $y_2$ is calculated to be 0.977. Similar calculations can be performed for each of the wheels of the vehicle. The results of Test #1 for each wheel of the vehicle are given below in Table #4. The closer the result of Test #1 is to a value of 1.000, the higher the reliability of the wheel speed signals.

TABLE #4

Results of Test #1

| | | |
|---|---|---|
| 1. | Left-Front Wheel | 0.977 |
| 2. | Right-Front Wheel | 0.786 |
| 3. | Left-Rear Wheel | 0.274 |
| 4. | Right-Rear Wheel | 0.004 |

Based on Test #1, the left-front wheel is the most reliable (i.e., the closest to 1.000), the right-front wheel is the second most reliable, the left-rear wheel is the third most reliable, and the right-rear wheel is the least reliable. Therefore, based on Test #1, the left-front wheel provides the most suitable wheel speed signals to be used to calculate an acceleration sensor offset.

Unstable wheels also have a large absolute value of wheel acceleration. A fuzzy test for determining whether the absolute value of wheel acceleration is large is given below as Test #2.

Test #2:

Absolute value of wheel acceleration small [1]

Figure 5D:
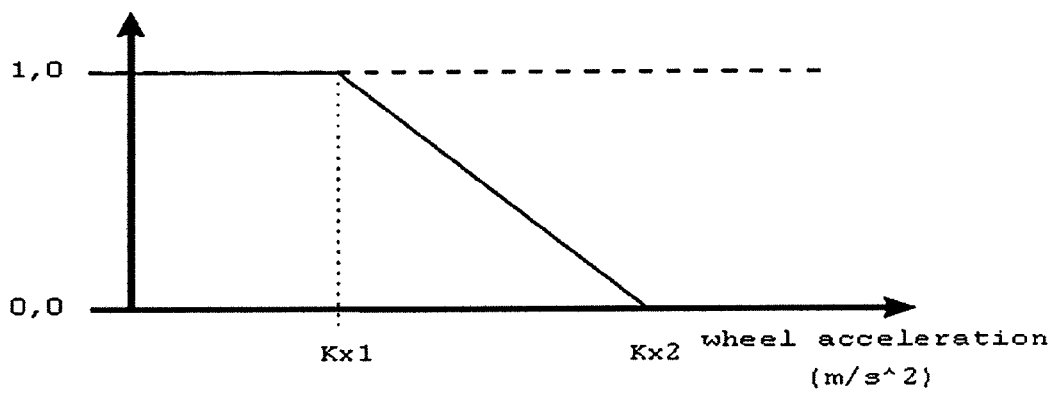
FIG. 5D is a diagram of a fuzzy plot for a fuzzy variable "small."

Test #2 can be evaluated in a similar manner as Test #1 above. A linguistic value for line 1 of Test #2 is determined using FIG. 5D, which shows a fuzzy plot for the fuzzy variable "small". $K_{x1}$ and $K_{x2}$ are predetermined values that are based on characteristics of the vehicle and characteristics of the ESC module 15. In the described embodiment, $K_{x1} = 4.2$ m/s$^2$ and $K_{x2} = 6.0$ m/s$^2$. The linguistic value for line 1 of Test #2 is determined for each wheel of the vehicle by associating the value of the wheel acceleration for each wheel or the vehicle 10 with a value of the fuzzy plot for the fuzzy variable "small." A wheel acceleration of between 0.0 and 4.2 m/s$^2$ has a value of 1.000. A wheel acceleration of 6 m/s$^2$ or greater has a value of approximately 0.000.

Unstable wheel signals also have a large deviation between wheel acceleration and vehicle model acceleration. A fuzzy test for determining whether there is a large deviation between wheel acceleration and model vehicle acceleration is given below as Test #3.

Test #3:

absolute value of wheel acceleration nearby vehicle model acceleration [1]

Figure 5E:
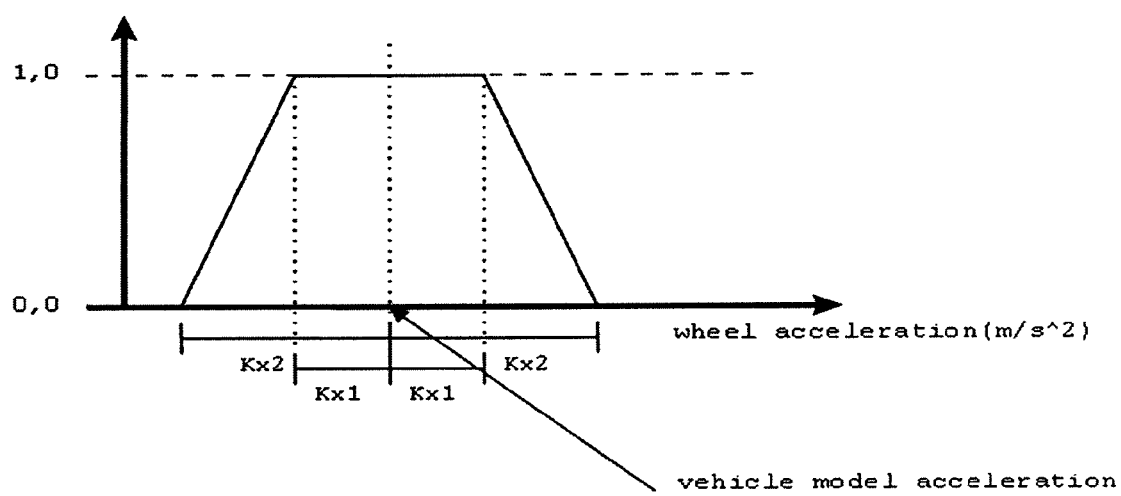
FIG. 5E is a diagram of a fuzzy plot for a fuzzy variable "nearby."

Test #3 can be evaluated in a similar manner as Test #2 above. A linguistic value for line 1 of Test #3 is determined using FIG. 5E, which shows a fuzzy plot for the fuzzy variable "nearby." $K_{x1}$ and $K_{x2}$ are predetermined values that are based on characteristics of the vehicle and characteristics of the ESC module 15. In the described embodiment, $K_{x1} = 0.45$ m/s$^2$ and $K_{x2} = 3.0$ m/s$^2$. The linguistic value for line 1 of Test #3 is determined for each wheel of the vehicle by associating the value of the wheel acceleration for each wheel with a value of the fuzzy plot for fuzzy variable "nearby." A wheel acceleration that is within 0.45 m/s$^2$ of the vehicle model acceleration has a fuzzy output estimate of 1.000. A wheel acceleration that is more than 0.45 m/s$^2$ but less than 3.0 m/s$^2$ away from the vehicle model acceleration has a fuzzy output estimate that can be determined using linear interpolation. A wheel acceleration that is more than 3.0 m/s$^2$ away from the vehicle model acceleration has a fuzzy output estimate approximately equal to 0.000.

In contrast, stable wheels exhibit a small difference between the wheel speed signals and the estimated absolute longitudinal velocity of the vehicle 10. A fuzzy test for determining whether the difference between the wheel speed signal and the estimated absolute longitudinal velocity of the vehicle 10 is given below as Test #4.

Figure 5F:
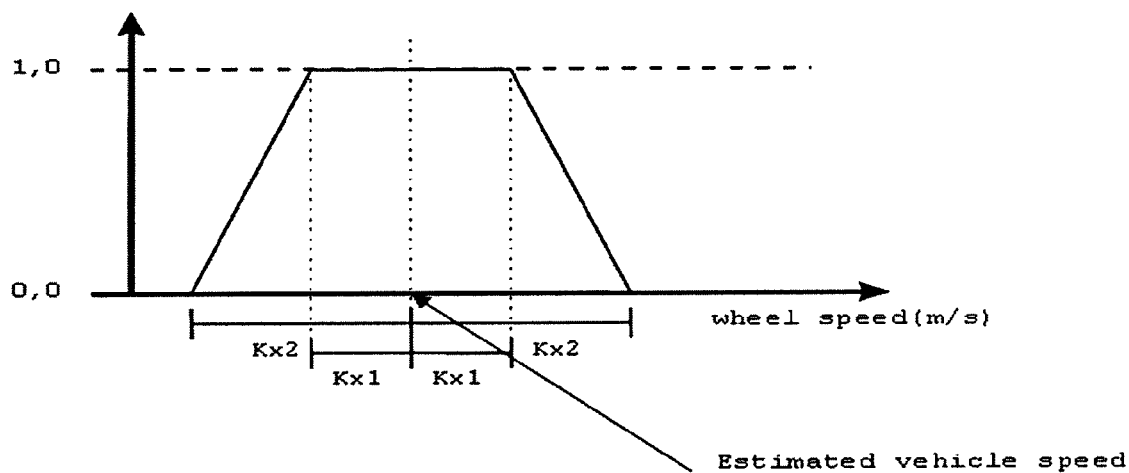
FIG. 5F is a diagram of a fuzzy plot for a fuzzy variable "nearby."

Test #4:

wheel speed nearby estimated vehicle speed
AND wheel speed nearest to estimated vehicle speed
OR distance between smallest and largest wheel speed small Test #4 can be evaluated in a similar manner as Test #1 above. A linguistic value for line 1 of Test is determined using FIG. 5F, which shows a fuzzy plot for the fuzzy variable "nearby." $K_{x1}$ and $K_{x2}$ are predetermined values that are based on characteristics of the vehicle and characteristics of the ESC module 15. In the described embodiment, $K_{x1} = 0.1$ m/s and $K_{x2} = 1.7$ m/s. The linguistic value for line 1 of Test #4 is determined for each wheel of the vehicle by associating the value of the wheel speed for each wheel with a value of the fuzzy plot for the fuzzy variable "nearby." A wheel speed that is within 0.1 m/s of the estimated vehicle speed has a fuzzy output estimate of 1.000. A wheel speed that is more than 0.1 m/s but less than 1.7 m/s away from the estimated vehicle speed has a fuzzy output estimate that can be determined using linear interpolation. A wheel speed that is more than 1.7 m/s away from the estimated vehicle speed has a fuzzy output estimate approximately equal to 0.000.

Figure 5G:
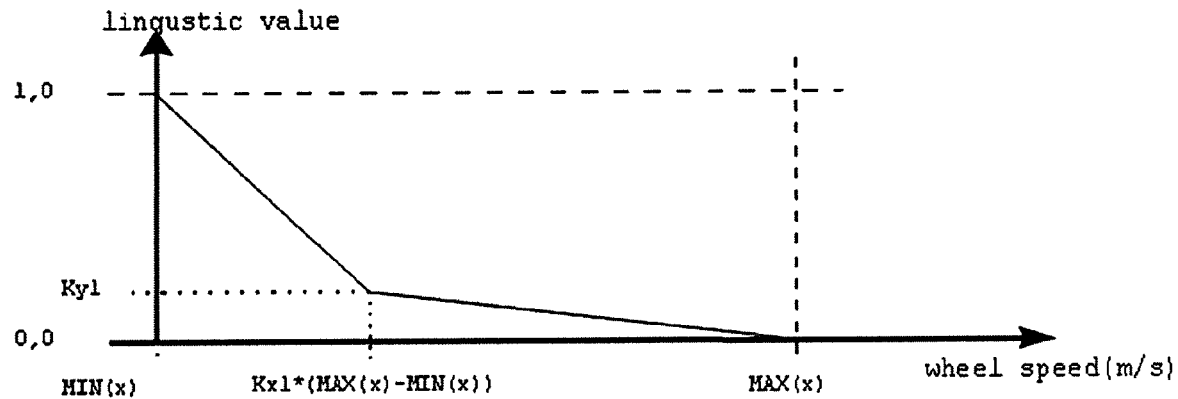
FIG. 5G is a diagram of a fuzzy plot for a fuzzy variable "nearest."

A linguistic value for line 2 of Test #4 is determined using FIG. 5G, which shows a fuzzy plot used to calculate the fuzzy variable "nearest." $K_{y1}$ has a value that is based on characteristics of the vehicle and characteristics of the ESC module 15. $K_{x1}$ has a value that depends on the MAX and MIN values of the wheel speed signals. In the illustrated embodiment, $K_{y1}$ is equal to 0.2. The linguistic value for line 2 of Test #4 is determined for each wheel of the vehicle by associating the value of the wheel speed for each wheel with a value of the fuzzy plot for the fuzzy variable "nearest."

Figure 5H:
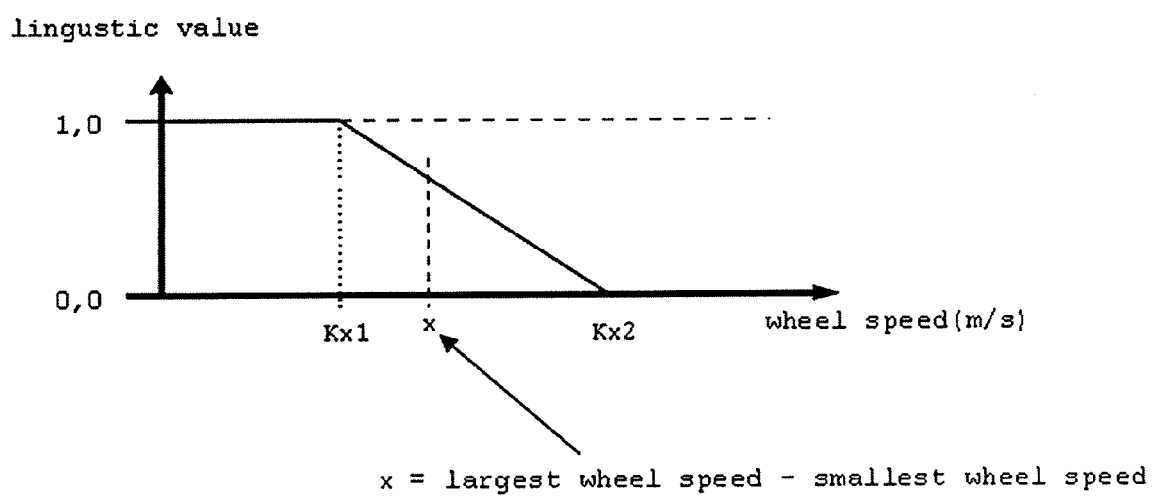
FIG. 5H is a diagram of a fuzzy plot associated with a relative distance between two wheel speed values.

A linguistic value for line 3 of Test #4 is determined using FIG. 5H, which shows a fuzzy plot associated with the relative distance between two wheel speed values. $K_{x1}$ and $K_{x2}$ are predetermined values that are based on characteristics of the vehicle and characteristics of the ESC module 15. In the described embodiment, $K_{x1}$=0.1 m/s and $K_{x2}$=0.4 m/s. The linguistic value for line 3 of Test #4 is determined for each wheel of the vehicle using the difference between the largest value of wheel speed and the smallest value of wheel speed.

Results for each of fuzzy tests 2-4 can be calculated in similar manner to Test #1 above using the "AND" and "OR" fuzzy operators where necessary. Based on the combination of the results of each test, the fuzzy logic unit 120 calculates a set of fuzzy values for the wheel speed signals, wheel acceleration signals, and wheel jerk signals associated with each wheel of the vehicle 10. The set of fuzzy values corresponding to each wheel is then used to calculate the wheel stability probabilities corresponding to the stability of wheel speed sensor signals for each wheel. The wheel stability probabilities are output individually or as a set of values to the Kalman filter module 125. In other embodiments, more or different fuzzy tests are performed and used to determine wheel stability probabilities.

The greater the amount of instability in a respective wheel speed signal, the lower the wheel stability probability is for that wheel. In one embodiment of the invention, a fuzzy value of 128 is used to indicate zero instability in a wheel speed signal. A lower value, such as 108, indicates that the signals from that wheel speed sensor include a substantial amount of instability. Alternatively, a fuzzy value can be divided by 128 to produce a decimal representation of the fuzzy value (e.g. 108/128=0.8438).

Tables 5-8 (shown below) demonstrate actual fuzzy sets for each of the four wheels (e.g., front-right, front-left, rear-right, rear-left) of a test vehicle accelerating up a 20% incline. The fuzzy set or set of values for each wheel is shown to include a set of nine values or calculations. The wheel speed (1) is measured by a respective wheel speed sensor for each wheel. The fuzzy values for wheel jerk (2), wheel acceleration (3), and wheel speed (5) are determined by the fuzzy combination module described above with respect to FIG. 3. The wheel stability probability (9) is a numeric representation of the likelihood that the wheel speed signals for each respective wheel are stable and is calculated by dividing the sum of lines (4) and (7) by the value that represents the smallest amount of wheel speed signal instability, 128. A wheel stability probability of approximately 1 indicates highly reliable wheel speed signals. The reliability of the wheel speed signals is used by the filter gain module 230 (described below) to select Kalman filter gain coefficients.

TABLE 5

Fuzzy Set For Left-Front Wheel

| | | |
|---|---|---|
| 1. | Wheel Speed [m/s] | 9.02778 |
| 2. | Wheel Jerk | 117 |
| 3. | Wheel Acceleration | 127 |
| 4. | Fuzzy Sum of 2 and 3 | 119 |
| 5. | Wheel Speed | 127 |
| 6. | Wheel Speed – Vehicle Speed | 127 |
| 7. | Fuzzy Sum of 5 and 6 | 127 |
| 8. | Fuzzy Sum of 4 and 7 | 121 |
| 9. | Wheel Stability Probability | 0.945313 |

TABLE 6

Fuzzy Set For Right-Front Wheel

| | | |
|---|---|---|
| 1. | Wheel Speed [m/s] | 9.07986 |
| 2. | Wheel Jerk | 81 |
| 3. | Wheel Acceleration | 127 |
| 4. | Fuzzy Sum of 2 and 3 | 92 |
| 5. | Wheel Speed | 127 |
| 6. | Wheel Speed – Vehicle Speed | 127 |
| 7. | Fuzzy Sum of 5 and 6 | 127 |
| 8. | Fuzzy Sum of 4 and 7 | 100 |
| 9. | Wheel Stability Probability | 0.78125 |

TABLE 7

Fuzzy Set For Left-Rear Wheel

| | | |
|---|---|---|
| 1. | Wheel Speed [m/s] | 9.02778 |
| 2. | Wheel Jerk | 117 |
| 3. | Wheel Acceleration | 127 |
| 4. | Fuzzy Sum of 2 and 3 | 119 |
| 5. | Wheel Speed | 127 |
| 6. | Wheel Speed – Vehicle Speed | 127 |
| 7. | Fuzzy Sum of 5 and 6 | 127 |
| 8. | Fuzzy Sum of 4 and 7 | 121 |
| 9. | Wheel Stability Probability | 0.945313 |

TABLE 8

Fuzzy Set For Right-Rear Wheel

| | | |
|---|---|---|
| 1. | Wheel Speed [m/s] | 9.07986 |
| 2. | Wheel Jerk | 108 |
| 3. | Wheel Acceleration | 127 |
| 4. | Fuzzy Sum of 2 and 3 | 112 |
| 5. | Wheel Speed | 127 |
| 6. | Wheel Speed – Vehicle Speed | 127 |
| 7. | Fuzzy Sum of 5 and 6 | 127 |
| 8. | Fuzzy Sum of 4 and 7 | 115 |
| 9. | Wheel Stability Probability | 0.898438 |

The filter gain module 230 receives the output signals from the fuzzy operations module 220 (e.g., wheel stability probabilities for each wheel). The filter gain module 230 determines values for a set of Kalman filter gain coefficients based on the stability of the wheel speed signals. The set of Kalman filter gain coefficients is output to the Kalman filter module 125. The Kalman filter gain coefficients are selected to minimize the estimation error of the Kalman filter module 125, as described below.

The Kalman filter module 125 is configured as a recursive filter that estimates the state of a dynamic system with noisy inputs. For example, the Kalman filter module 125 receives a corrupted signal from the first sensor 110 (e.g., a corrupted acceleration sensor signal). The Kalman filter module 125 also receives the wheel stability probabilities and Kalman filter gain coefficients as inputs from the fuzzy logic unit 120. Based on the received signals and a known vehicle model, the Kalman filter module 125 estimates an absolute longitudinal velocity ("vFzREF") and an acceleration sensor offset ("axOffAxSensor") for the vehicle 10 based on the values from the fuzzy logic unit.

Figure 4:
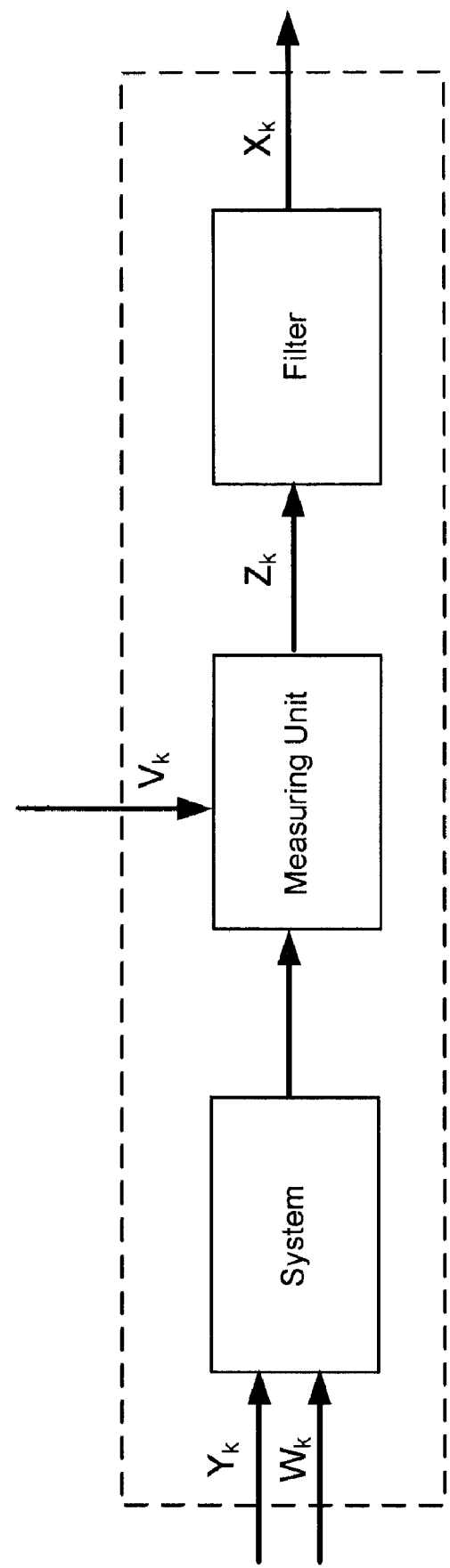
FIG. 4 illustrates a state diagram for a sensor signal compensation system.

A state model 300 for the sensor signal compensation system 100 is illustrated in FIG. 4. The input $y_k$ is a 2×1 matrix that represents an acceleration sensor signal. In many instances, the acceleration sensor signal has been corrupted with noise, an offset, or a combination of noise and offset, as described above. The $y_k$ matrix is given below.

$$y_k = \begin{bmatrix} AxSensor \\ 0 \end{bmatrix}$$

The input $w_k$ represents white noise from, for example, the acceleration or wheel speed sensors. The input $w_k$ is independent of $y_k$ and does not need to be known for the sensor signal compensation system 100 to compensate the sensor signals. Values for the absolute longitudinal velocity of the vehicle and the acceleration sensor offset are unknown states of the vehicle 10 and are given by $x_k$ below.

$$x_k = \begin{bmatrix} vFzREF \\ axOffAxSensor \end{bmatrix}$$

Input variable $z_k$ is a weighted variable based on the wheel stability probabilities from the fuzzy operations module of the fuzzy logic unit 120. Input $v_k$ represents a sensor (e.g., wheel speed sensor) measurement error that is caused by, for example, the fluctuation of power consumption by the sensor. Like $w_k$, the input $v_k$ also does not need to be known for the sensor signal compensation system 100 to compensate the sensor signals. The sensor signal compensation system 100 is, however, capable of compensating for the effects of both the white noise input variable $w_k$ and the measurement error input variable $v_k$. Output variable $x_k'$ is a 2×1 matrix that includes the state variables for the unknown states of the vehicle 10.

The sensor signal compensation system 100 is modeled as a stationary time-discrete Kalman-Bucy filter. A general form of the stationary time-discrete Kalman-Bucy filter is given below.

$$x_k' = F_k x_{k-1}' + y_k + K[z_k - H_k(Fx_{k-1}' + y_k)]$$

The system includes two unknown state variables and, therefore, requires two state equations. Following an integration of the $x_k'$ state variables, the estimated absolute longitudinal velocity of the vehicle 10 is given by the below equation.

$$vFzREF_k = vFzREF_{k-1} + (Ax\text{sensor}_k + ax\text{Off}Ax\text{Sensor}_{k-1}) \cdot t_0$$

The vehicle 10's estimated absolute longitudinal velocity during a current cycle (e.g., a current calculation period) is estimated based on an extrapolation of a previous cycle's estimated longitudinal velocity using a corrected vehicle acceleration sensor signal (e.g., the combination of the vehicle acceleration sensor signal and the previously calculated acceleration sensor offset signal). The time factor $t_0$ is a result of the integration and is related to a cycle length or sample period for each calculation.

The acceleration sensor offset signal is used as the second state equation and is assumed to be non-varying. That is, the acceleration offset correction term is assumed to be equal to the previous cycles acceleration offset correction term or is assumed to have a small or negligible change from one calculation to the next.

The factors $F_k$ and $H_k$, introduced above in the general form of the discrete-time Kalman-Bucy filter, are constant matrices that are selected based on a Kalman filter system model (i.e., the desired outputs of the state equations) used in the Kalman filter module 125. In some embodiments, $F_k$ and $H_k$ have the values given below. In other embodiments, $F_k$ and $H_k$ have different values.

$$F_k = \begin{bmatrix} 1 & 1 \\ 0 & 1 \end{bmatrix}$$

$$H_k = \begin{bmatrix} 1 & 0 \end{bmatrix}$$

A resultant matrix equation to estimate the absolute longitudinal velocity of the vehicle 10, and the acceleration sensor offset is given below.

$$\begin{bmatrix} vFzREF \\ axOffAxSensor \end{bmatrix}_k = \begin{bmatrix} 1 & 1 \\ 0 & 1 \end{bmatrix} \begin{bmatrix} vFzREF \\ asOffAxSensor \end{bmatrix}_{k-1} + \left( \begin{bmatrix} AxSensor \\ 0 \end{bmatrix} + \begin{bmatrix} kovx \\ koaxOff \end{bmatrix} \left( z_k - \begin{bmatrix} 1 & 0 \end{bmatrix} \cdot \begin{bmatrix} vFzREF \\ axOffAxSensor \end{bmatrix}_{k-1} \right) \right)$$

The value K shown in the general form of the time-discrete Kalman-Bucy filter is a 2×1 matrix that includes the calculated Kalman filter gain coefficients kovx and koaxOff which are calculated in the filter gain module 230 of the fuzzy logic unit 120. The Kalman filter gain coefficients are based on the stability of wheel speed signals, as described above. If the wheel speed signals have a high reliability, the Kalman filter gain coefficients are large. If the wheel speed signals have a low reliability, the Kalman filter gain coefficients are small. Large Kalman filter gain coefficients result in the Kalman filter module 125 converging to accurate estimates of the absolute longitudinal speed of the vehicle 10 and acceleration sensor offset in a short period of time. Small Kalman filter gain coefficients result in the Kalman filter module 125 taking a longer time to converge to accurate estimates of the absolute longitudinal velocity of the vehicle 10 and acceleration sensor offset (when compared to large Kalman filter gain coefficients).

Table 9 demonstrates the affect of the sensor signal compensation system 100. Values 1-4 listed below are the measured wheel speeds from each of the four wheels of a vehicle (taken from Tables 5-8 above).

TABLE 9

| | Results | |
|---|---|---|
| 1. | Left-Front Wheel Speed [m/s] | 9.02778 |
| 2. | Right-Front Wheel Speed [m/s] | 9.07986 |
| 3. | Left-Rear Wheel Speed [m/s] | 9.02778 |
| 4. | Right-Rear Wheel Speed [m/s] | 9.07986 |
| 5. | Estimated Long. Velocity [m/s] | 8.92361 |
| 6. | Acceleration Sensor Output [m/s$^2$] | 3.09245 |
| 7. | Acceleration Sensor Offset [m/s$^2$] | −2.24668 |
| 8. | Compensated Acceleration Sensor Output [m/s$^2$] | .840929 |

The estimated longitudinal velocity of the vehicle 10 (element "5" in Table 9) is calculated to be 8.92361 m/s. The acceleration sensor offset (element "7" in Table 9) from the Kalman filter module 125 is estimated to be −2.24668 m/s$^2$. The negative acceleration sensor offset from the Kalman filter module 125 indicates that the vehicle 10 is traveling uphill. The compensated acceleration sensor output (element "8" in Table 9) is calculated as a combination of the acceleration sensor output (element "6" in Table 9) and the acceleration sensor offset (element "7" in Table 9). The compensated acceleration sensor output (element "8" in Table 9) and the estimated longitudinal velocity (element "5" in Table 9) of the vehicle 10 are then sent to the ESC module 15. The compensated acceleration sensor output (element "8" in Table 9) and the estimated longitudinal velocity (element "5" in Table 9) provide the ESC module 15 with acceleration and velocity signals similar to those of a vehicle 10 that is traveling over level terrain (e.g., terrain with no incline or decline). A compensated acceleration sensor output that is approximately equal to the longitudinal acceleration of the vehicle 10 ensures that the ESC module 15 is receiving an accurate estimated longitudinal velocity for which to generate actuation signals for the actuators 25 (e.g., hydraulic pumps).

Thus, the invention provides, among other things, a system and method for compensating sensor signals in a vehicle. Various features and advantages of the invention are set forth in the following claims.

What is claimed is:

1. A system for vehicle sensor signal compensation, the system comprising:
    a first sensor configured to generate a first signal corresponding to a first condition of a vehicle;
    a second sensor configured to generate a second signal corresponding to a second condition of the vehicle;
    a fuzzy logic module configured to receive the second signal and output a first set of values indicative of a signal stability of at least the second signal; and
    a Kalman filter module configured to receive the first set of values and the first signal, and to determine a sensor compensation signal based on at least the first set of values and the first signal.

2. The system of claim 1, wherein the first sensor is an acceleration sensor and the second sensor is a wheel speed sensor.

3. The system of claim 1, wherein the first set of values includes a set of Kalman filter gain coefficients.

4. The system of claim 1, further comprising a combination module configured to combine the sensor compensation signal and the first signal.

5. The system of claim 1, wherein the sensor compensation signal is an acceleration sensor compensation signal.

6. The system of claim 1, wherein the Kalman filter module is configured to estimate an absolute longitudinal velocity of the vehicle.

7. The system of claim 1, wherein the second signal is a wheel speed signal.

8. The system of claim 1, wherein the fuzzy logic module is configured to receive a third signal corresponding to a first derivative of the second signal and a fourth signal corresponding to a second derivative of the second signal.

9. A method of sensor signal compensation comprising:
    generating a first signal corresponding to a first condition of a vehicle;
    generating a second signal corresponding to a second condition of the vehicle;
    receiving, at a fuzzy logic module of an electronic stability controller, at least the second signal;
    outputting, from the fuzzy logic module, a first set of values indicative of a signal stability of at least the second signal;
    receiving, at a Kalman filter module of the electronic stability controller, the first set of values and the first signal;
    determining a sensor compensation signal based on at least the first set of values and the first signal; and
    controlling an operation of the vehicle, by the electronic stability controller, based on the sensor compensation signal.

10. The method of claim 9, wherein the first signal is related to an acceleration of the vehicle and the second signal is related to a wheel speed of the vehicle.

11. The method of claim 9, wherein outputting the first set of values includes outputting a set of Kalman filter gain coefficients.

12. The method of claim 9, further comprising combining the sensor compensation signal and the first signal.

13. The method of claim 9, wherein the sensor compensation signal is an acceleration sensor compensation signal.

14. The method of claim 9, further comprising estimating, at the Kalman filter module, an absolute longitudinal velocity of the vehicle.

15. The method of claim 9, further comprising receiving, at the fuzzy logic module, a third signal corresponding to a first derivative of the second signal and a fourth signal corresponding to a second derivative of the second signal.

16. A system for compensating sensor signals in a vehicle comprising:
    an acceleration sensor configured to generate an acceleration signal corresponding to a first acceleration of the vehicle;
    a wheel speed sensor configured to generate a first wheel speed signal corresponding to a first wheel speed of the vehicle;
    a fuzzy logic module configured to output a first set of values corresponding to a signal stability of at least the first wheel speed signal; and
    a Kalman filter module configured to receive the first set of values and the acceleration signal;
    wherein the Kalman filter module is configured to determine an acceleration sensor compensation signal using at least the first set of values and the acceleration signal.

17. The system of claim 16, wherein the first set of values includes a set of Kalman filter gain coefficients.

18. The system of claim 16, further comprising a combination module configured to combine the acceleration sensor compensation signal and the acceleration signal.

19. The system of claim 16, wherein the Kalman filter module is configured to estimate an absolute longitudinal velocity of the vehicle.

20. The system of claim 16, wherein the fuzzy logic module is configured to receive a first signal corresponding to a first derivative of the first wheel speed signal and a second signal corresponding to a second derivative of the first wheel speed signal.

* * * * *